Patented Mar. 13, 1934

1,950,878

UNITED STATES PATENT OFFICE

1,950,878

PROCESS OF TREATING HYDROCARBONS

Robert E. Burk, Cleveland, Ohio, assignor to The Standard Oil Company, Cleveland, Ohio, a corporation of Ohio No Drawing. Application June 6, 1932,
Serial No. 615,560½

3 Claims. (Cl. 196—39)

This invention relates to the preparing of hydrocarbon liquids, and it is among the objects of the invention to provide an advantageous process for removing undesired substances, and thereby making possible, in the case for instance of lubricating stocks, the improving of viscosity index, color, etc. Other objects and advantages will appear as the description proceeds.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

In proceeding in accordance with the invention, I treat hydrocarbon mixtures such as a lubricating stock with chlorosulphonic acid, $ClSO_2OH$. Ordinary temperatures may be employed, or the temperature may be raised. More particularly in some cases, it is desirable to lower the temperature. If the treatment be carried out in an agitator-type of apparatus, the coils or jacket thereof may be employed to meet such condition, and the temperature may be kept below about 150° F. In some cases, a more intensive cooling, such as to —10° F. may be desired. The amount of chlorosulphonic acid may be about 8-12 per cent, depending somewhat upon the particular material being treated. While continuous-type treatment and proportional mixing may be employed, it is usually more desirable to mix and agitate batch-wise, for instance in two or three dumps. After thorough agitation for one to three hours, depending upon the thoroughness of admixture, and the bulk of material and the temperature, the mass is allowed to settle and the sludge constituent layer is separated off. The oil is then neutralized, preferably by an adsorbent, as for instance a clay, preferably of fine mesh, say 200 mesh, the amount of adsorbent allowed being ample to eliminate residual acids. It is advisable to also raise the temperature at this stage, to about 250°–300° F., and thoroughly mix or agitate. The oil is then filtered.

As an illustrative example: A 400 viscosity red oil, reduced from Mid-Continent pressed oil, having a gravity of 24.1 A. P. I., a viscosity index of 60, a color of 8 N. P. A., and a carbon residue of 0.50, is treated with about 37 pounds of chlorosulphonic acid per barrel, added in two dumps and being well agitated for about one-half hour, at about 80° F. The mass is then allowed to settle and the sludge is drawn off. About 5 per cent by weight of a 200 mesh clay is added, the temperature is raised to 250°–300° F., and the oil thoroughly agitated for about one hour, and then filtered. The finished oil shows a gravity of 26.0, a viscosity index of 80, color 4, and a carbon test of 0.05 per cent.

Other modes of applying the principle of the invention may be employed, change being made as regards the details described, provided the features stated in any of the following claims, or the equivalent of such, be employed.

I therefore particularly point out and distinctly claim as my invention:—

1. A process of treating hydrocarbons, which comprises subjecting a lubricating stock to about 8–12 per cent by weight of chloro-sulphonic acid, separating the sludge, neutralizing by an adsorbent, heating to about 250°–300° F., and separating the adsorbent.

2. A process of treating hydrocarbons, which comprises subjecting a lubricating stock to about 8–12 per cent by weight of chloro-sulphonic acid, controlling temperature rise, separating the sludge, neutralizing by an adsorbent, heating to about 250°–300° F., and separating the adsorbent.

3. A process of treating hydrocarbons, which comprises subjecting a lubricating stock to the action of about 8–12 per cent by weight of chloro-sulphonic acid in successive portions, controlling temperature rise, separating the sludge, neutralizing by an adsorbent, heating to about 250°–300° F., and separating the adsorbent.

ROBERT E. BURK.